United States Patent
Yoshida et al.

(10) Patent No.: US 9,355,792 B2
(45) Date of Patent: May 31, 2016

(54) GAS INSULATED SWITCHGEAR

(71) Applicant: Mitsubishi Electric Corporation, Chiyoda-ku, Tokyo (JP)

(72) Inventors: Tadahiro Yoshida, Tokyo (JP); Masahiro Arioka, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 0 days.

(21) Appl. No.: 14/443,753

(22) PCT Filed: Feb. 3, 2014

(86) PCT No.: PCT/JP2014/052417
§ 371 (c)(1),
(2) Date: May 19, 2015

(87) PCT Pub. No.: WO2014/125948
PCT Pub. Date: Aug. 21, 2014

(65) Prior Publication Data
US 2015/0340174 A1    Nov. 26, 2015

(30) Foreign Application Priority Data

Feb. 13, 2013  (JP) ................................. 2013-025803

(51) Int. Cl.
*H01H 3/46*   (2006.01)
*H02B 13/00*  (2006.01)
*H02B 13/035* (2006.01)

(52) U.S. Cl.
CPC ................ *H01H 3/46* (2013.01); *H02B 13/00* (2013.01); *H02B 13/0352* (2013.01); *H02B 13/0354* (2013.01); *H02B 13/0358* (2013.01)

(58) Field of Classification Search
CPC ......... H01H 3/46; H01H 33/662; H02B 1/20; H02B 1/24; H02B 1/30; H02B 13/00; H02B 13/035; H02B 13/045; H02B 13/055; H02B 13/0358; H02B 13/0352; H02B 13/005

USPC ........ 361/604, 605, 608, 611, 612, 617, 618, 361/620–624, 632, 637, 634, 640–648; 218/2–14, 16, 43, 140, 143, 153, 154, 218/78–84, 120, 155; 200/50.1, 307; 174/50, 50.02, 50.04; 312/223.2
See application file for complete search history.

(56) References Cited

U.S. PATENT DOCUMENTS 2,218,554 A * 10/1940 Rossman ............... H02B 11/04
                                                361/606
(Continued)

FOREIGN PATENT DOCUMENTS

JP        60-22404 A      2/1985
JP      02004064955 A *   2/2004  ............ H02B 13/02
(Continued)

OTHER PUBLICATIONS

International Search Report (PCT/ISA/210) mailed on Apr. 22, 2014, by the Japanese Patent Office as the International Searching Authority for International Application No. PCT/JP2014/052417.

*Primary Examiner* — Michail V Datskovskiy
(74) *Attorney, Agent, or Firm* — Buchanan Ingersoll & Rooney PC

(57) ABSTRACT

A gas insulated switchgear includes: gas tanks filled with insulating gas; a circuit breaker which is arranged such that the shaft center direction of a driving shaft thereof is parallel to a front portion of the gas tank and horizontal; a first disconnecting switch which is arranged on the lower side of the circuit breaker and is electrically connected to the circuit breaker; a busbar whose one end is connected to the circuit breaker and the other end is extended in the shaft center direction of the driving shaft of the circuit breaker; a second disconnecting switch electrically connected to the busbar; a cable terminal led out outside the gas tank from the first disconnecting switch; and a cable terminal led out outside the gas tank from the second disconnecting switch.

20 Claims, 14 Drawing Sheets

(56) References Cited

U.S. PATENT DOCUMENTS

| | | | | |
|---|---|---|---|---|
| 6,459,567 B2 * | 10/2002 | Arioka | H02B 13/0358 | 174/18 |
| 6,504,125 B2 * | 1/2003 | Nishitani | H02B 13/045 | 218/155 |
| 6,510,046 B2 * | 1/2003 | Arioka | H02B 13/0358 | 218/120 |
| 6,518,531 B2 * | 2/2003 | Arioka | H02B 13/035 | 218/12 |
| 6,865,072 B2 * | 3/2005 | Sato | H02B 13/0354 | 218/155 |
| 7,193,172 B2 * | 3/2007 | Rokunohe | H01H 33/22 | 218/43 |
| 7,417,846 B2 * | 8/2008 | Arioka | H02B 13/035 | 361/604 |
| 8,743,532 B2 * | 6/2014 | Yano | H02B 1/56 | 165/104.33 |
| 2002/0060204 A1 * | 5/2002 | Tohya | H02B 13/055 | 215/155 |
| 2009/0296320 A1 * | 12/2009 | Fink | H02B 13/035 | 361/612 |

FOREIGN PATENT DOCUMENTS

| | | |
|---|---|---|
| JP | 2006-67721 A | 3/2006 |
| JP | 2007-28776 A | 2/2007 |

* cited by examiner

GAS INSULATED SWITCHGEAR

TECHNICAL FIELD

The present invention relates to a gas insulated switchgear for use in power receiving and transforming facilities that supply electric power and the like.

BACKGROUND ART

A switchgear is a protection system in which a circuit breaker, a disconnecting switch, a earthing switch, a voltage detector, and the like are consolidated in a container; the switchgear covers opening and closing functions necessary for power transforming facilities in electric power systems; and the switchgear is required for necessity for a reduction in size from restriction of a site to be installed and the like.

Therefore, for example, in a gas insulated switchgear of Patent Document 1, a circuit breaker and a plurality of disconnecting switches, both of which are contained in an gas tank filled with insulating gas in a state extended in a horizontal direction, are arranged to be disposed in a vertical direction in the tank, thereby achieving minimization of installation area.

RELATED ART DOCUMENT

Patent Document

Patent Document 1: JP2007-28776 A

SUMMARY OF THE INVENTION

Problems to be Solved by the Invention

However, in the gas insulated switchgear of Patent Document 1, interrupting apparatus elements and a plurality of switching apparatus elements, both of which are contained in the gas tank filled with insulating gas in the state extended in the horizontal direction, are disposed in a predetermined vertical relationship, thereby achieving the minimization of installation area. As for the size of the gas insulated switchgear, the outline dimensions thereof are constrained by the circuit breaker whose dimension in a driving shaft direction is the largest among apparatuses contained in the inside. However, there are quite a few cases where a dimension in a depth direction is constrained depending on a place where the gas insulated switchgear is installed. The gas insulated switchgear needs to be installed in an elongate space whose dimension in the depth direction is short, for example, like an electrical compartment of a wind turbine of a wind-power generation system. In such a case, one which determines the dimension in the depth direction among apparatuses constituting the gas insulated switchgear is the circuit breaker whose dimension in a longitudinal direction including a driving portion is the largest; and accordingly, there arises a problem as to how the circuit breaker is arranged. This is not necessarily taken into account in a conventional gas insulated switchgear and, generally, the width thereof is narrow and the dimension in the depth direction is long. Accordingly, a problem exists in that installation cannot be made at such a place where the dimension in the depth direction is constrained.

The present invention has been made to solve the foregoing problem, and an object of the present invention is to provide a gas insulated switchgear which is short in a depth direction and can be installed even at a place whose installation space is narrow.

Means for Solving the Problems

In order to solve the foregoing problem, a gas insulated switchgear according to claim 1 of the present invention includes: an gas tank filled with insulating gas; a circuit breaker which is contained in the gas tank, has a driving portion that drives a driving shaft, and is arranged such that the driving shaft is parallel to a front portion of the gas tank and horizontal; a first disconnecting switch which is contained in the gas tank, has a driving portion that drives a driving shaft, and is electrically connected to one end of the circuit breaker; a busbar which is contained in the gas tank, and is arranged to be electrically connected to the other end of the circuit breaker; second disconnecting switches of at least one set, the second disconnecting switches being contained in the gas tank, having a driving portion that drives a driving shaft, and being electrically connected to the busbar; a first external lead-out circuit which is electrically connected to the first disconnecting switch, and passes through the wall surface of the gas tank to be led out outside the gas tank; and second external lead-out circuits corresponding to the number of sets of the second disconnecting switches, the second external lead-out circuits being electrically connected to the second disconnecting switches, and passing through the wall surface of the gas tank to be led out outside the gas tank.

A gas insulated switchgear according to claim 2 of the present invention includes: an gas tank filled with insulating gas; circuit breakers for the number of phases, the circuit breakers being contained in the gas tank, having a driving portion that drives a driving shaft, and being arranged such that the driving shaft is parallel to a front portion of the gas tank and horizontal; first disconnecting switches for the number of phases, the first disconnecting switches being contained in the gas tank, having a driving portion that drives a driving shaft, and being electrically connected to each one end of the circuit breakers; busbars for the number of phases, the busbars being contained in the gas tank, and being arranged to be electrically connected to the other ends of the circuit breakers; second disconnecting switches for the number of phases of at least one set, the second disconnecting switches being contained in the gas tank, having a driving portion that drives a driving shaft, and being electrically connected to the busbars; first external lead-out circuits for the number of phases, the first external lead-out circuits being electrically connected to the first disconnecting switches, and passing through the wall surface of the gas tank to be led out outside the gas tank; and second external lead-out circuits for the number of phases of the number of sets corresponding to the number of sets of the second disconnecting switches, the second external lead-out circuits being electrically connected to the second disconnecting switches, and passing through the wall surface of the gas tank to be led out outside the gas tank.

Furthermore, a gas insulated switchgear according to claim 19 or 20 of the present invention is installed in a wind turbine of a wind-power generation system.

Advantageous Effect of the Invention

According to a gas insulated switchgear of the present invention, a driving shaft of a circuit breaker is arranged so as to be parallel to a front portion of the gas insulated switchgear and horizontal, whereby advantageous effects are exhibited in that the depth dimension of the gas insulated switchgear can be shortened without giving an influence on its performance and the gas insulated switchgear can be installed even at a narrow place whose depth dimension is constrained in an installation space.

MODE FOR CARRYING OUT THE INVENTION

Embodiment 1

Figure 1:
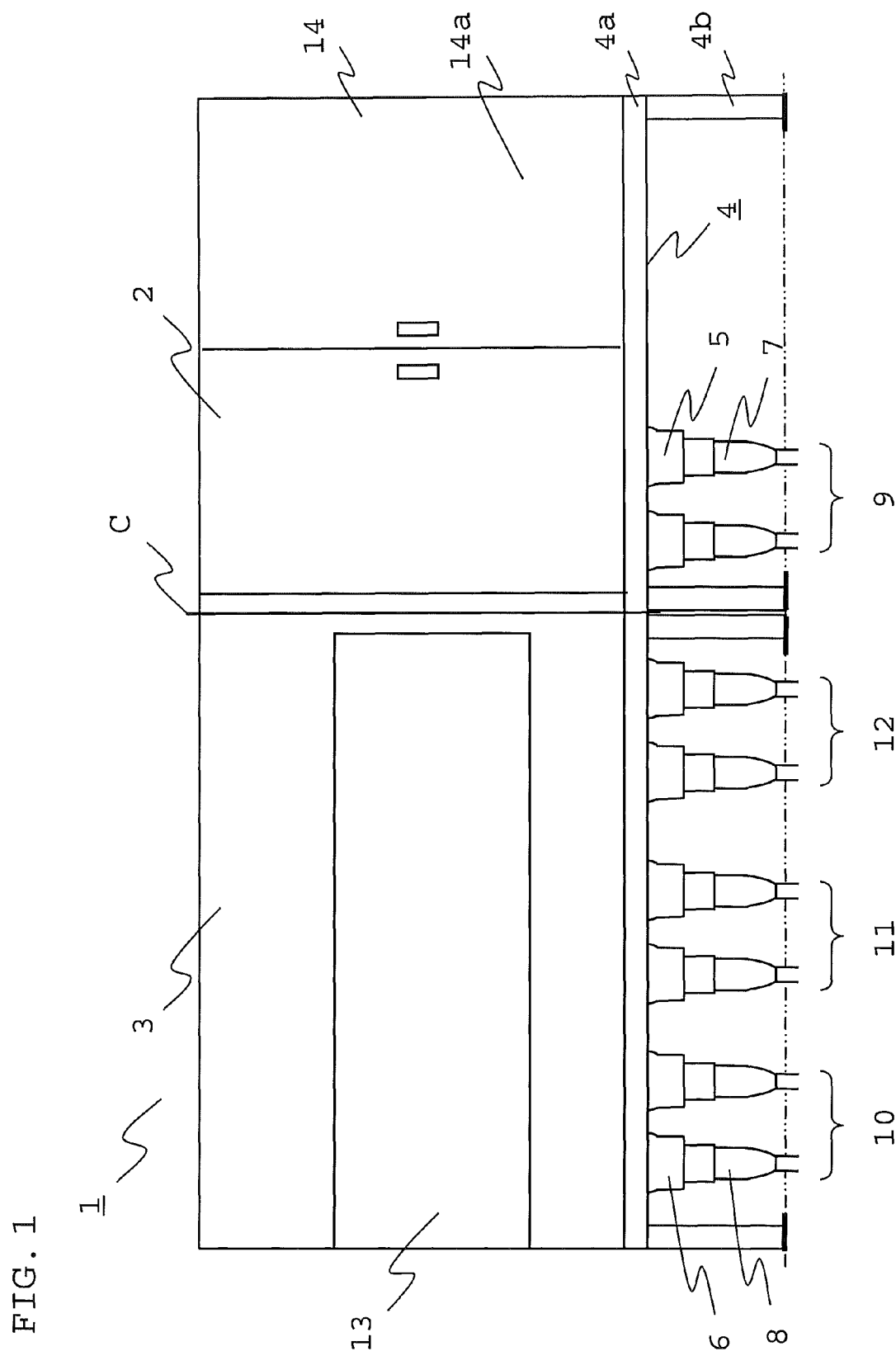
FIG. 1 is an outline view seen from the front of a gas insulated switchgear according to Embodiment 1.
Figure 2:
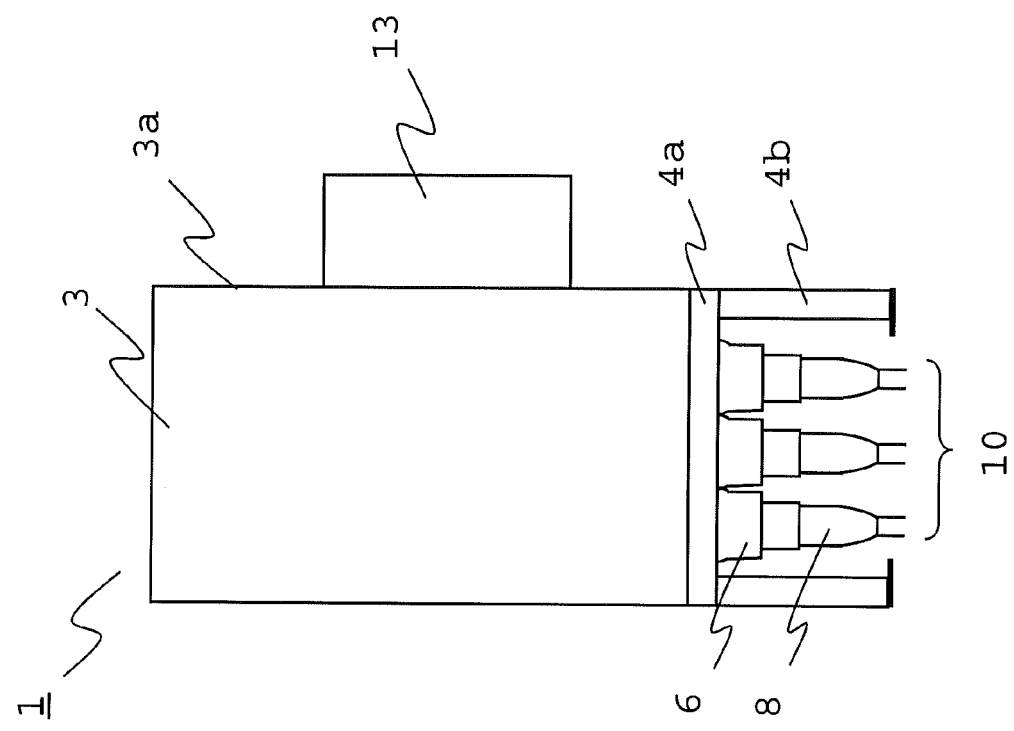
FIG. 2 is an outline view seen from the left side of the gas insulated switchgear according to Embodiment 1.
Figure 3:
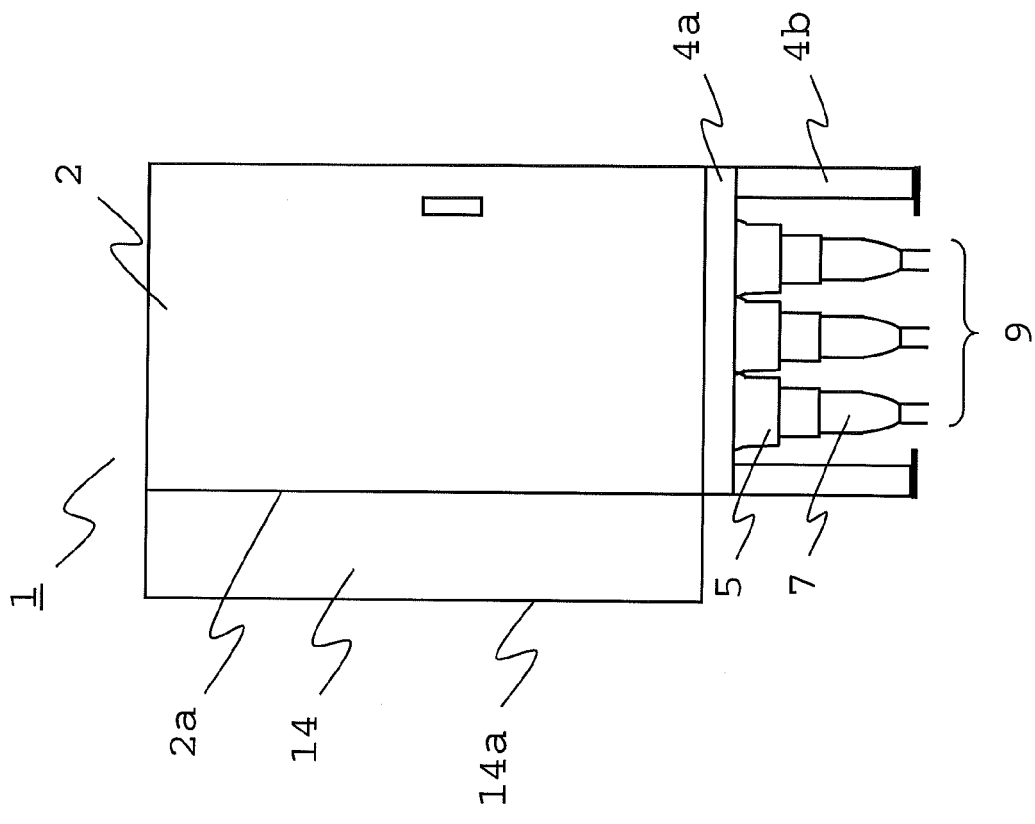
FIG. 3 is an outline view seen from the right side of the gas insulated switchgear according to Embodiment 1.
Figure 4:
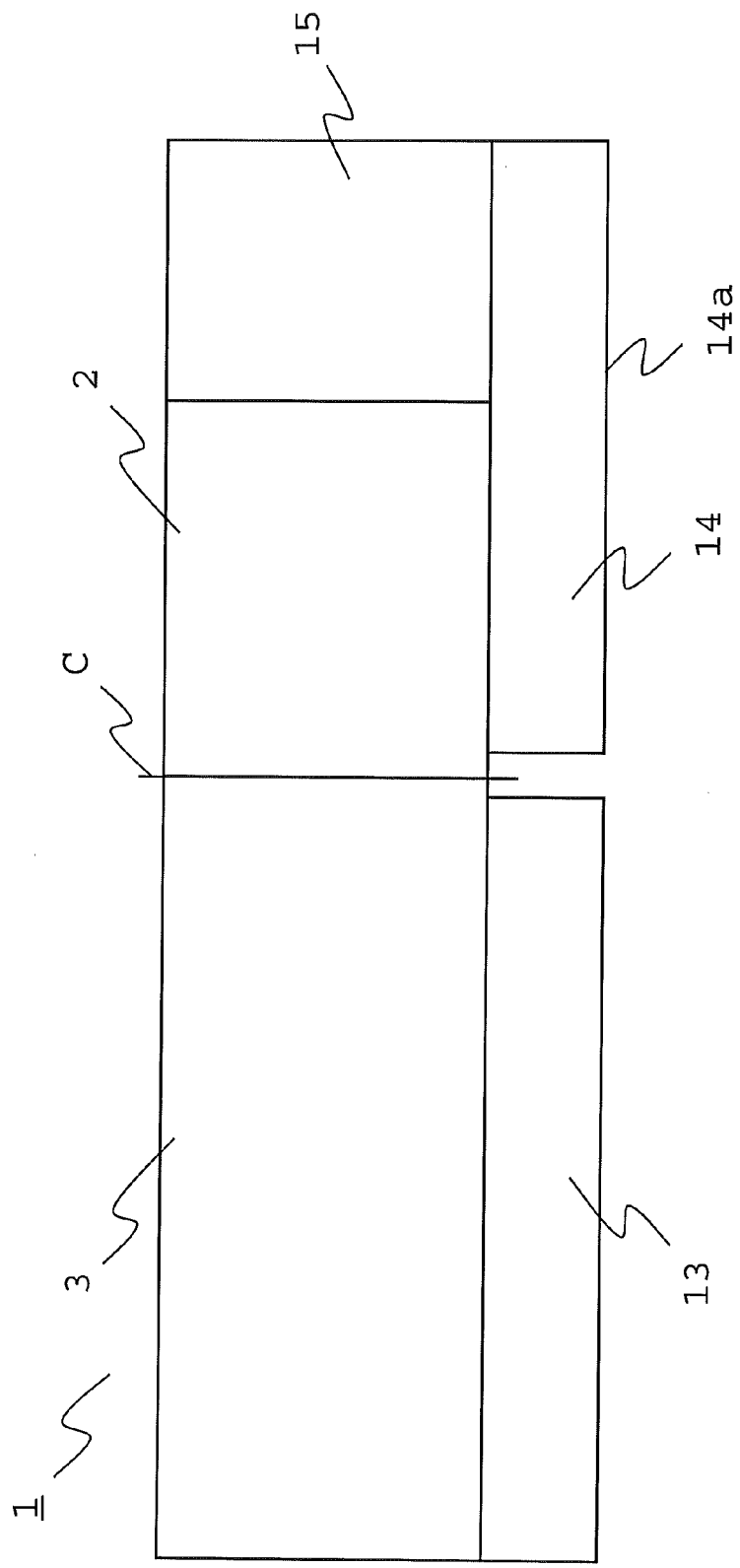
FIG. 4 is a top surface outline view seen from the top surface of the gas insulated switchgear according to Embodiment 1.
Figure 5:
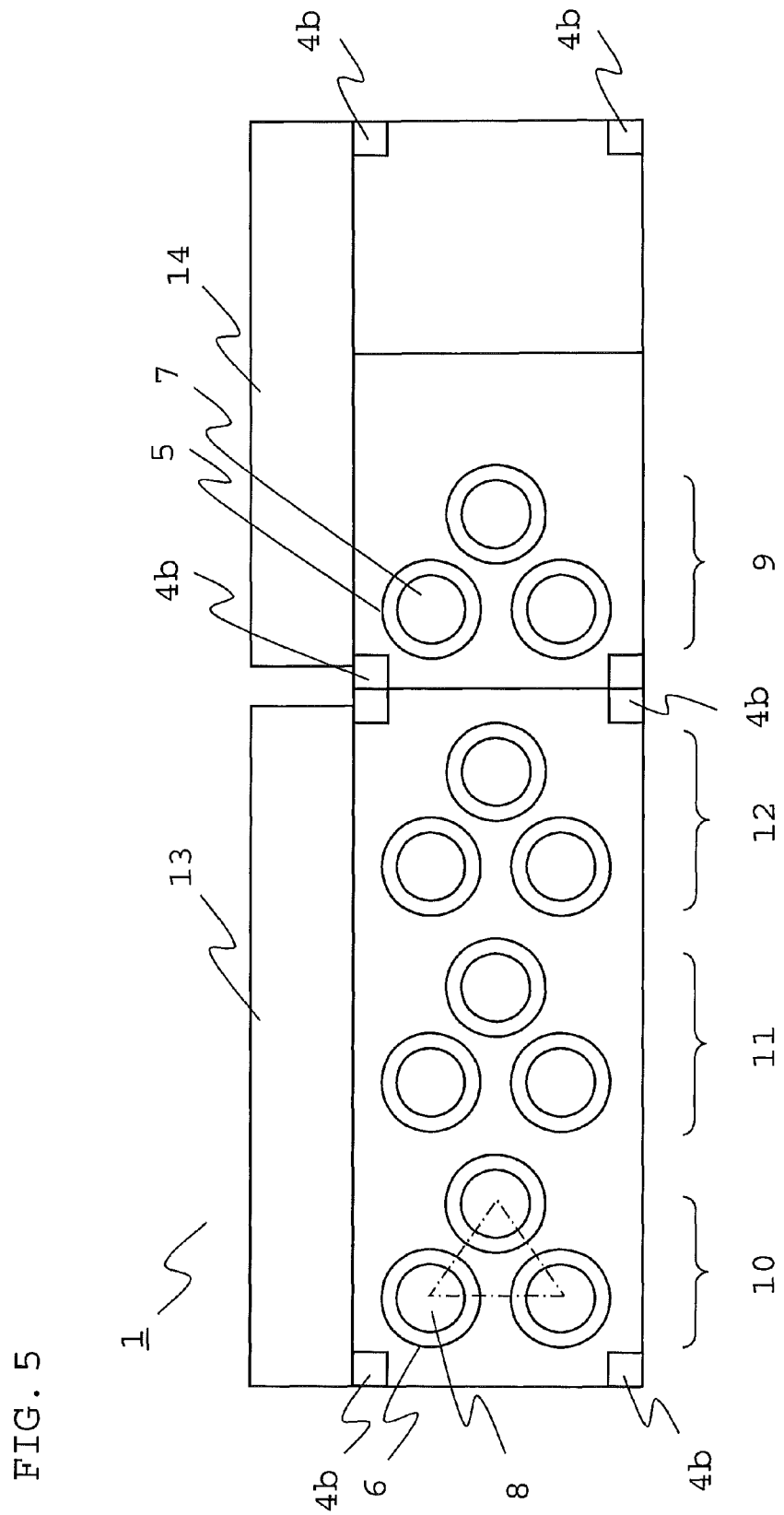
FIG. 5 is a base outline view seen from the base of the gas insulated switchgear according to Embodiment 1.
Figure 6:
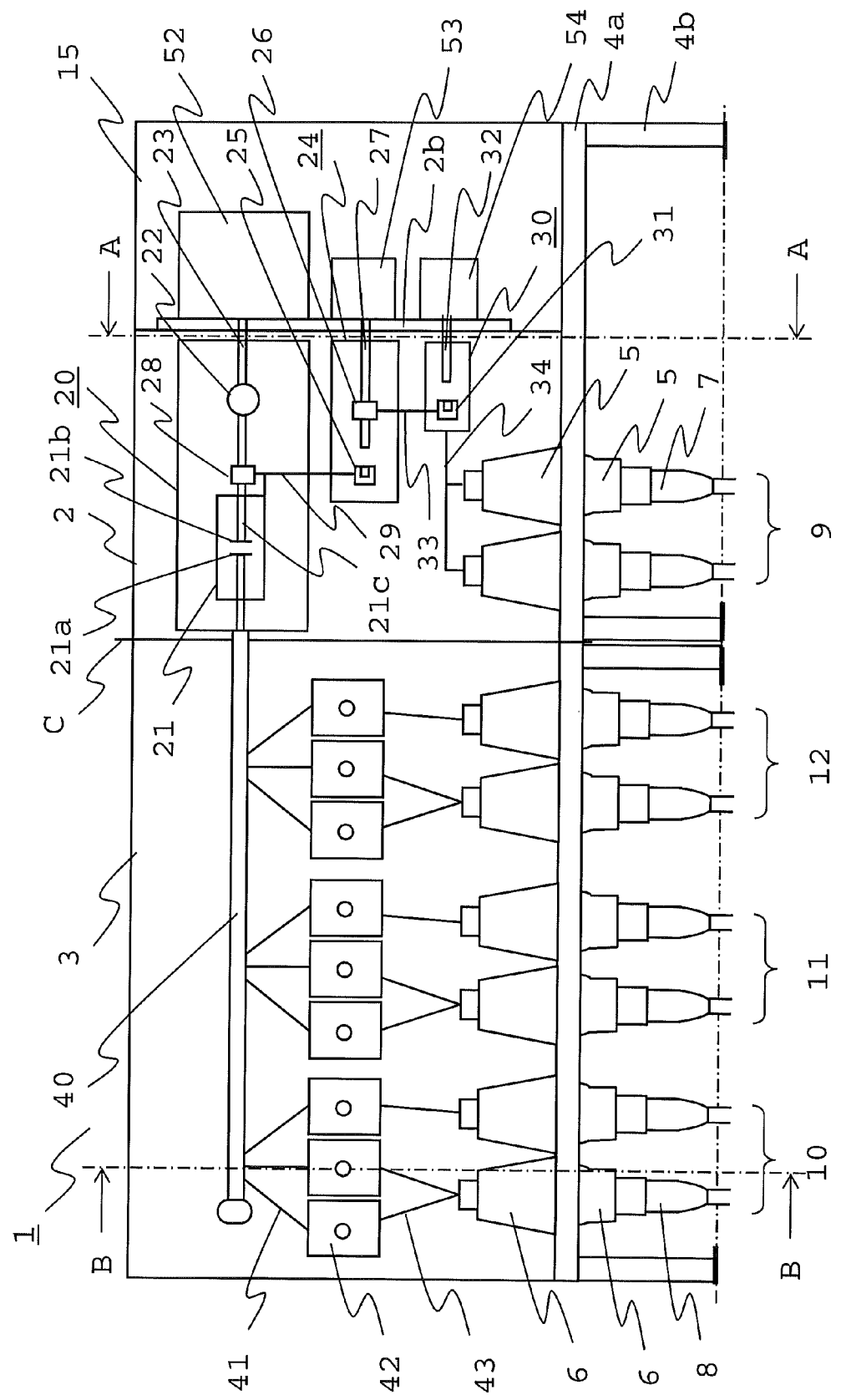
FIG. 6 is a perspective view showing an internal configuration seen from the front of the gas insulated switchgear according to Embodiment 1.
Figure 7:
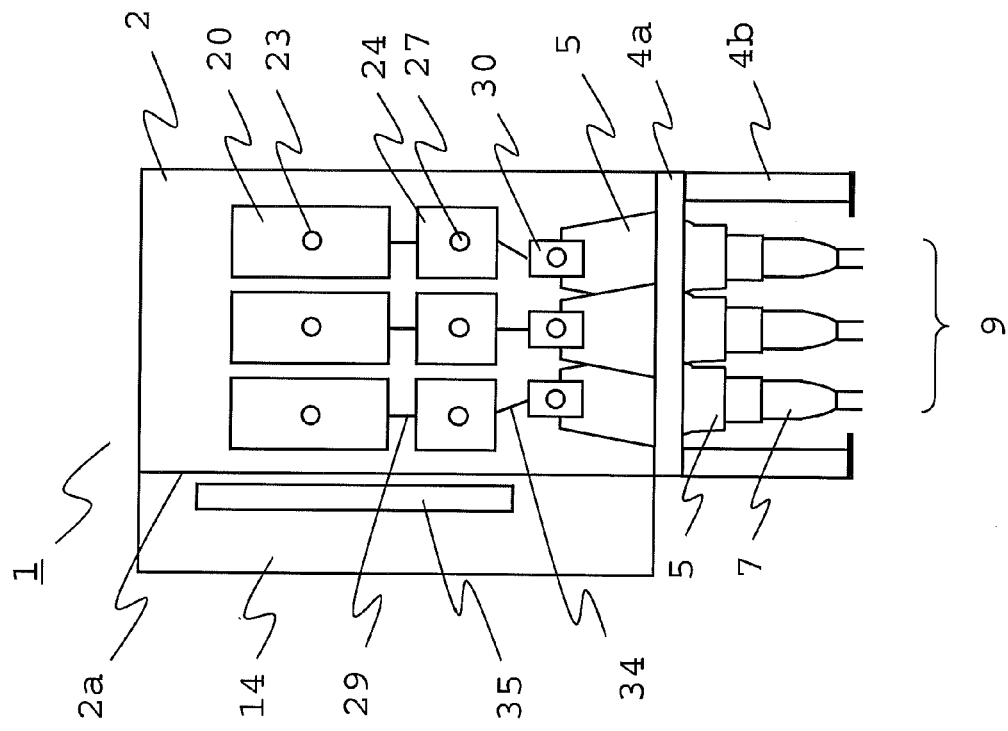
FIG. 7 is a relevant part view seen from an A-A portion of FIG. 6.
Figure 8:
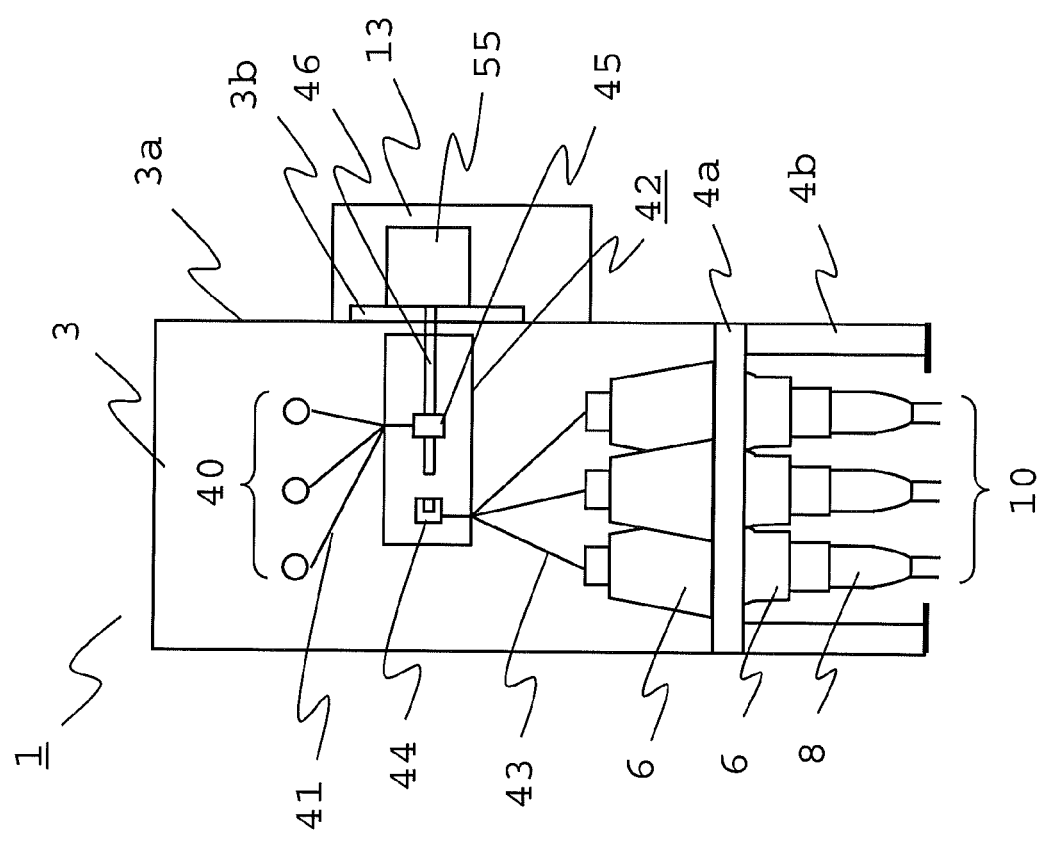
FIG. 8 is a relevant part view seen from a B-B portion of FIG. 6.
Figure 9:
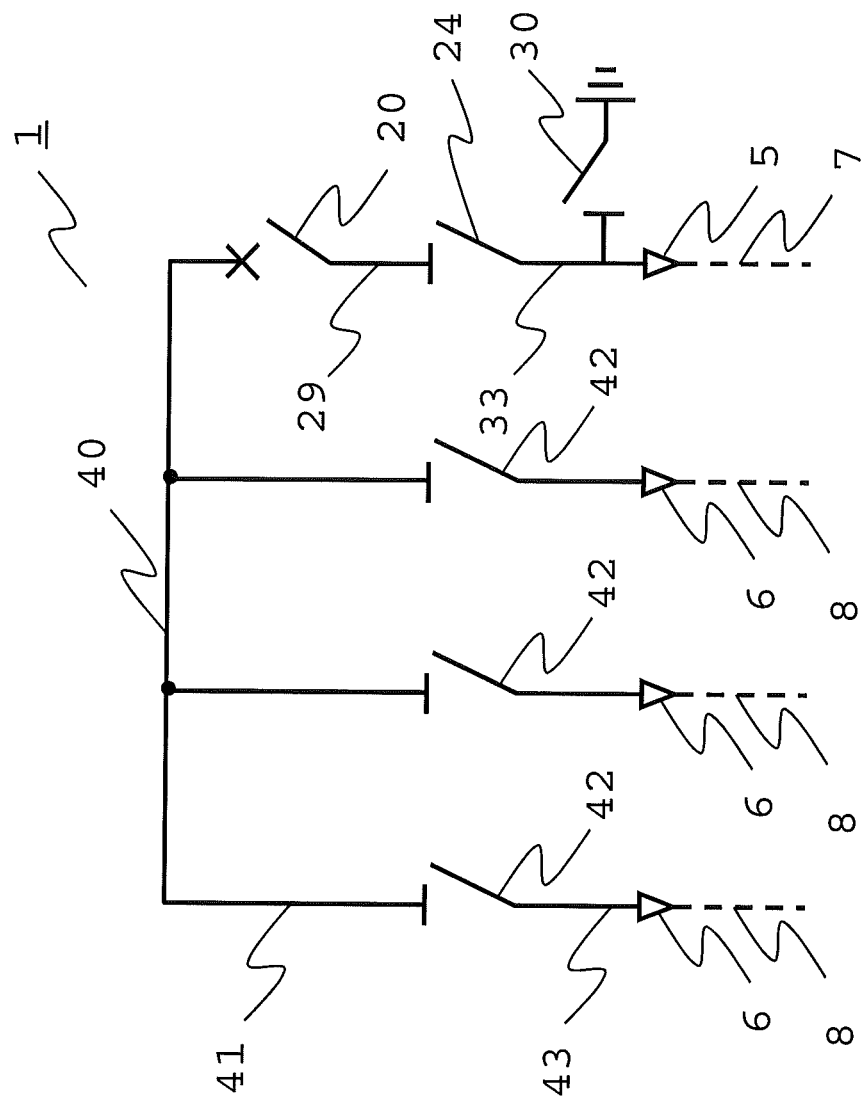
FIG. 9 is a single line diagram of the gas insulated switchgear according to Embodiment 1.

FIG. 1 is an outline view seen from the front of a gas insulated switchgear according to Embodiment 1; FIG. 2 is an outline view seen from the left side thereof; FIG. 3 is an outline view seen from the right side; FIG. 4 is a top surface outline view seen from the top surface; FIG. 5 is a base outline view seen from the base. Furthermore, FIG. 6 is a perspective view showing the whole configuration seen from the front; FIG. 7 is a relevant part view seen from an A-A portion of FIG. 6; and FIG. 8 is a relevant part view seen from a B-B portion of FIG. 6. In addition, FIG. 9 is a single line diagram of the gas insulated switchgear.

As shown in FIG. 1 to FIG. 8, a gas insulated switchgear 1 includes: a first gas tank 2 serving as an gas tank in which a circuit breaker 20, a first disconnecting switch 24, and a earthing switch 30 are contained; a second gas tank 3 in which a busbar 40 and a second disconnecting switch 42 are contained; a base frame 4 (a frame portion 4a, a frame portion 4b) on which the first gas tank 2 and the second gas tank 3 connected to each other at a connection portion C are placed; a cable terminal 5 serving as a first external lead-out circuit which passes through a base portion of the first gas tank 2 and is connected to the earthing switch 30 in the first gas tank 2; a cable terminal 6 serving as a second external lead-out circuit which passes through a base portion of the second gas tank 3 and is connected to the second disconnecting switch 42 in the second gas tank 3; a power cable 7 connected to the cable terminal 5; a power cable 8 connected to the cable terminal 6; a first circuit 9 composed of three phase (three) power cables 7; a second circuit 10, a third circuit 11, and a fourth circuit 12, each of which is composed of three phase (three) power cables 8; an operation portion 13 in which a driving portion 55 of the second disconnecting switch 42 is contained; a control box 14 in which a control circuit 35 that performs the whole operation of the gas insulated switchgear 1 is contained; and an operation portion 15 in which driving portions 52, 53, and 54 of the circuit breaker 20, the first disconnecting switch 24, and the earthing switch 30 are contained. In addition, as insulating gas, sulphur hexafluoride (SF6), dry air, or the like is filled in the first gas tank 2 and the second gas tank 3. Incidentally, in this case, a description will be made on a case where electric power is a three-phase configuration. Therefore, a constitutional apparatus is composed of three units per one set.

As is apparent from the base outline view of FIG. 5, the first circuit 9 is composed of three cable terminals 5; and the second circuit 10, the third circuit 11, and the fourth circuit 12 are each composed of three cable terminals 6. Three cable terminals 5 and 6 are arranged at the apexes of each triangle on the base portion of the first gas tank 2 and the second gas tank 3. Furthermore, the arrangement is made such that central phases of three cable terminals 5 and 6 are displaced in a lateral direction so as to reduce a dimension in a depth direction (a dimension in the vertical direction of FIG. 5). Further, the second circuit 10, the third circuit 11, and the fourth circuit 12 are arranged so as to be in line in the right and the left directions to be a configuration elongated to the right and to the left.

In the operation of the gas insulated switchgear 1, the circuit breakers 20, the first disconnecting switches 24, and the earthing switches 30 are operated from the right side by the driving portions 52, 53, and 54, respectively, placed in the operation portion 15 on the right side; and the second disconnecting switches 42 are operated from the front by the driving portion 55 placed in the operation portion 13 on the front of a front portion 3a of the second gas tank 3. Furthermore, the control box 14 in which the control circuit 35 is contained is placed on the front of the first gas tank 2; and inspection and operation of the control circuit 35 can be performed by opening a door 14a.

Next, the arrangement and operation of internal apparatuses of the gas insulated switchgear 1 will be specifically described referring to FIG. 6 to FIG. 8. First, the description will be made on the arrangement of the internal apparatuses contained in the first gas tank 2. The circuit breaker 20 is arranged such that the shaft center direction of a driving shaft 23 thereof is parallel to a front portion 2a of the first gas tank 2 of the gas insulated switchgear 1 and horizontal. Furthermore, the circuit breaker 20 opens and closes an electric power circuit by a vacuum interrupter 21 such that the driving shaft 23 of the circuit breaker 20 is moved in the horizontal direction by the driving portion 52 to a fixed contact point 21a of the vacuum interrupter 21 to move a movable contact point 21b via an insulation rod 22.

Furthermore, the first disconnecting switch 24 is arranged on the lower side of the circuit breaker 20 and the first disconnecting switch 24 is arranged such that the shaft center of a driving shaft 27 is parallel to the shaft center of the driving shaft 23 of the circuit breaker 20 and horizontal. The first disconnecting switch 24 opens and closes an electric power circuit such that the driving shaft 27, which has a current conducting portion between the fixed contact 25 and a sliding contact 26 at a tip end portion, is moved in the horizontal direction to the fixed contact 25 by the driving portion 53 while being made to come in contact with the sliding contact 26. In this case, a sliding contact 28 mounted on a conductive driving shaft 21c of the movable contact point 21b of the circuit breaker 20 is electrically connected to the fixed contact 25 of the first disconnecting switch 24 by a connection conductor 29.

Furthermore, the earthing switch 30 is arranged on the lower side of the first disconnecting switch 24 and is made to ground the cable terminal 5 side of the circuit breaker 20 by making a conductive driving shaft 32 come in contact with a fixed contact 31. The sliding contact 26 of the first disconnecting switch 24 is electrically connected to the fixed contact 31 of the earthing switch 30 by a connection conductor 33. Further, the fixed contact 31 of the earthing switch 30 is electrically connected to the cable terminal 5 by a connection conductor 34. The circuit breaker 20, the first disconnecting switch 24, and the earthing switch 30 are attached to a side portion of the first gas tank 2. In this case, the circuit breaker 20, the first disconnecting switch 24, and the earthing switch 30 are attached to one sheet of a mounting plate 2b; and this mounting plate 2b may be attached to the first gas tank 2 and thus mounting workability of the apparatuses is improved.

Subsequently, internal apparatuses contained in the second gas tank 3 will be described. The busbar 40 is electrically connected to the fixed contact point 21a of the circuit breaker 20 at one end thereof; and the other end is extended in the shaft center direction of the driving shaft 23 of the movable contact point 21b of the circuit breaker 20. As shown in FIG. 8, three (three phase) busbars 40 are arranged in parallel with a predetermined distance in the horizontal direction. Electrical connection is made from three busbars 40 to three second disconnecting switches 42 corresponding to the second circuit 10, the third circuit 11, and the fourth circuit 12 by connection conductors 41, respectively. Furthermore, the second disconnecting switches 42 are electrically connected to the cable terminals 6 of the second circuit 10, the third circuit 11, and the fourth circuit 12 by connection conductors 43, respectively.

As shown in FIG. 8, a driving shaft 46 of the second disconnecting switch 42 is arranged so as to be orthogonal to the horizontally extending direction of the busbars 40. More specifically, the moving direction of the driving shaft 46 having a current conducting portion between a fixed contact 44 and a sliding contact 45 at a tip end portion of the second disconnecting switch 42 is orthogonal to the moving direction of the driving shaft 23 of the circuit breaker 20 or the moving direction of the driving shaft 27 of the first disconnecting switch 24. The driving shaft 46 is made to move in the vertical (front-back) direction with respect to the front portion 3a of the second gas tank 3 by the driving portion 55 placed in the operation portion 13, and the driving shaft 46 is connected to and disconnected from the fixed contact 44, thereby opening and closing an electric power circuit. Furthermore, the sliding contact 45 coming in contact with the driving shaft 46 is electrically connected to the connection conductor 41. The second disconnecting switch 42 is attached to the front portion 3a of the second gas tank 3. In this case, a plurality of the second disconnecting switches 42 are attached to one sheet of a mounting plate 3b; and this mounting plate 3b may be attached to the front of the second gas tank 3 and thus mounting workability of the apparatuses is improved.

FIG. 9 shows a single line diagram (circuit diagram) of the gas insulated switchgear 1 according to Embodiment 1. Switching of necessary electrical connection is made between the first circuit 9 and the second circuit 10, the third circuit 11, and the fourth circuit 12 by opening and closing operation of the circuit breaker 20, the first disconnecting switch 24, and the second disconnecting switch 42.

As discussed above, the circuit breaker 20 whose dimension in the driving shaft direction is the largest among constitutional elements used in the gas insulated switchgear 1 is arranged so that the direction of the driving shaft 23 is parallel to the front portion 2a of the first gas tank 2; and thus, the depth dimension of the system of the gas insulated switchgear 1 can be shortened and the gas insulated switchgear 1 can be installed even at a place where the depth dimension is constrained as the shape of the floor to be installed. Further, the driving shafts 46 of the second disconnecting switches 42, which need a plurality sets of three-phase constitutional disconnecting switches, are made to orthogonalize with respect to the driving shafts 23 of the circuit breakers 20 and the driving portion 55 of the second disconnecting switches 42 is placed on the front portion 3a side of the second gas tank 3; and thus, there is an effect that operation and inspection of the second disconnecting switches 42 can be easily carried out.

Incidentally, the gas insulated switchgear includes external lead-out circuits which are led out from the disconnecting switch and the circuit breaker and are for connecting to external apparatuses (devices on the power receiving side, apparatuses on the power supplying side, a generator, and the like). These external lead-out circuits are generally arranged so as to be capable of connecting by power cables from the back of the gas insulated switchgear, thereby causing an increase in outline dimensions of the gas insulated switchgear; whereas, in the gas insulated switchgear 1 according to the present embodiment, the cable terminals 5 and 6 serving as the external lead-out circuits are provided on the base portion of the gas tank 2 and 3; and thus, as compared to the case where the power cables are connected from the back, the length necessary for the cable terminals 5 and 6 can be shortened and, additionally, a degree of freedom in arrangement of apparatuses necessary for the configuration of the gas insulated switchgear 1 is increased and a floor area necessary for installation can be reduced.

Furthermore, by extending the busbar 40 in the horizontal direction with respect to the direction of the driving shaft 23 of the circuit breaker 20, the second disconnecting switches 42 are arranged on the lower side of the busbar 40 and the circuit breaker 20 and the first disconnecting switch 24 are arranged in the lateral direction seen from the front; and thus, the whole height of the system of the gas insulated switchgear 1 can be lowered and this is effective in the case of being installed at a place whose height is constrained.

Besides, the above description has been made on the case of three-phase gas insulated switchgear; however, it may be permissible in the case of a gas insulated switchgear other than three phases, for example, direct current or other number of phases such as a single-phase. Moreover, the constitutional apparatus (circuit breaker or disconnecting switch) may be one unit in the case of three-phase apparatus; however, the number of constitutional apparatuses in the case of a single-phase apparatus is determined in accordance with the number of phases, for example, three single-phase apparatuses are, used in the case of a three-phase circuit. Additionally, the above description has been made on a case example in which three sets of three-phase constitutional second disconnecting switches 42 are used; however, the number of sets of the second disconnecting switches 42 are varied in quantity as needed. In addition, the description has been made on the case where the earthing switch 30 is provided only on the first disconnecting switch 24 side; however, however, the earthing switch 30 may be provided on the second disconnecting switch 42 side and may be provided as needed, but need not be provided in some cases.

Incidentally, broad overviews of the three-phase apparatus and the single-phase apparatus of the aforementioned circuit breaker or first disconnecting switch are shown in FIG. 12 to FIG. 15. FIG. 12, FIG. 13, FIG. 14, and FIG. 15 show the three-phase circuit breaker, the three-phase disconnecting switch, the single-phase circuit breaker, and the single-phase disconnecting switch, respectively.

Figure 12:
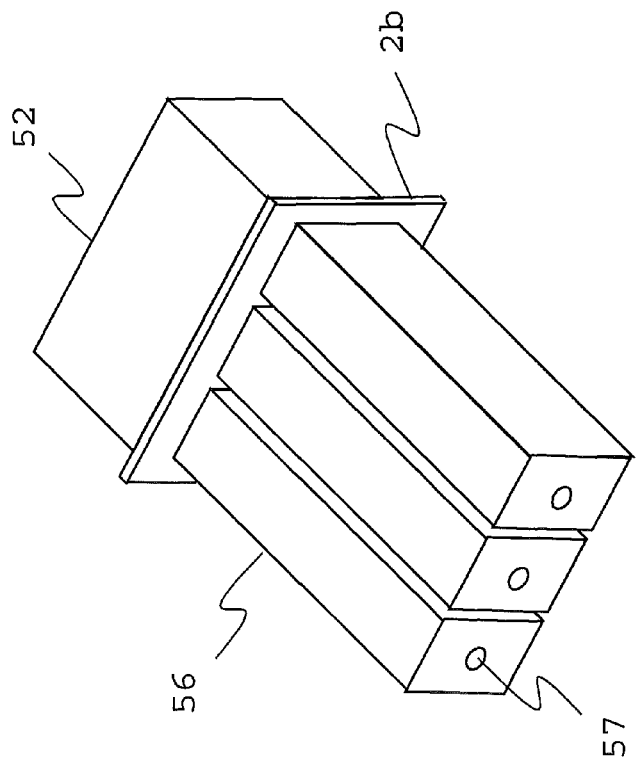
FIG. 12 is a perspective view of a three-phase circuit breaker.
Figure 14:
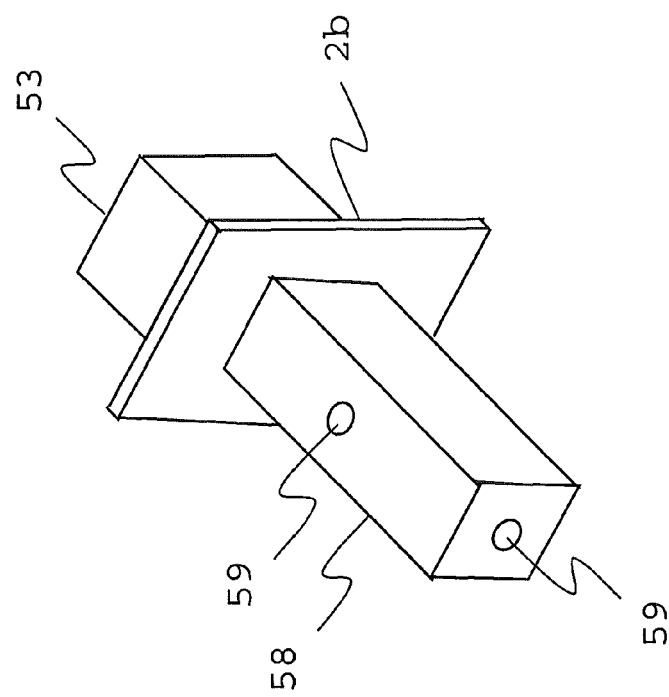
FIG. 14 is a perspective view of a single-phase circuit breaker.

In FIG. 12 and FIG. 14, the circuit breaker 20 includes: the mounting plate 2b to be attached to the first gas tank 2; a circuit breaker extinction chamber 56 in which an interruption portion is contained in a cylindrical case; and the driving portion 52 which drives the contact point in the circuit breaker extinction chamber 56. In the three-phase circuit breaker, three circuit breaker extinction chambers 56 are arranged in parallel with each other with respect to the mounting plate 2b to form extinction chambers for three phases as shown in FIG. 12 and this is operated such that the contact points in three phase circuit breaker extinction chambers 56 are opening/closing-driven by one driving portion 52 attached on the opposite side of the mounting plate 2b. In the single-phase circuit breaker, one circuit breaker extinction chamber 56 is arranged with respect to the mounting plate 2b as shown in FIG. 14 and this is operated such that the contact point in the circuit breaker extinction chamber 56 is opening/closing-driven by one driving portion 52 attached on the opposite side of the mounting plate 2b. Furthermore, an internal main circuit in the circuit breaker extinction chamber 56 is connected to an external main circuit by a terminal 57.

Figure 13:
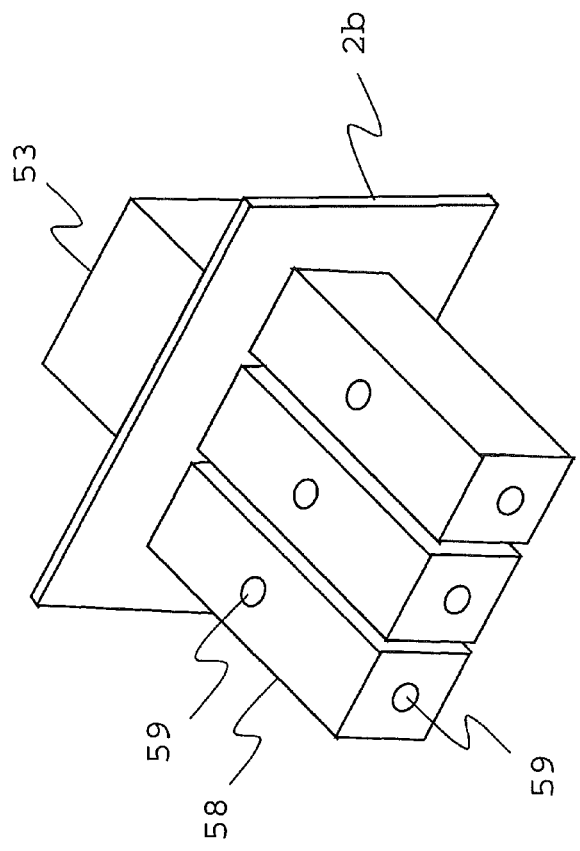
FIG. 13 is a perspective view of a three-phase disconnecting switch.
Figure 15:
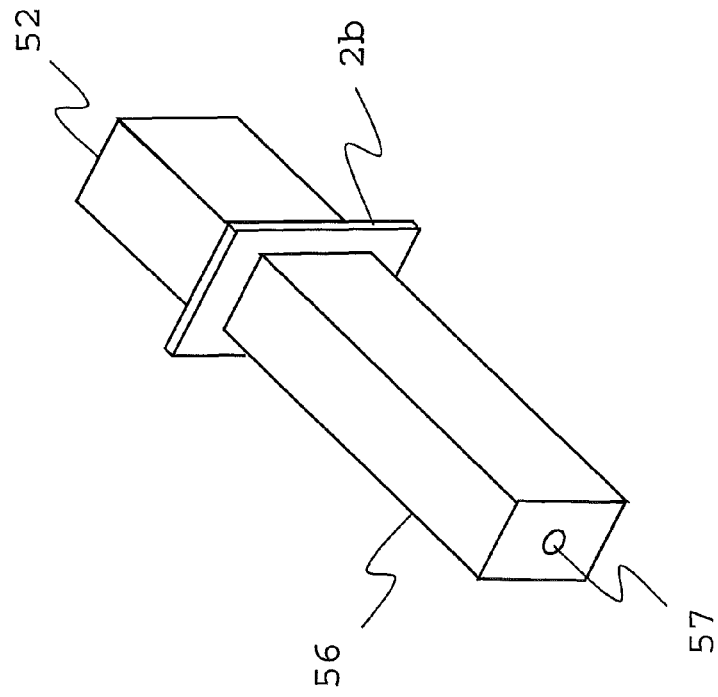
FIG. 15 is a perspective view of a single-phase disconnecting switch.

Furthermore, in FIG. 13 and FIG. 15, the first disconnecting switch 24 includes: the mounting plate 2b to be attached to the first gas tank 2; a disconnecting switch extinction chamber 58 in which an opening and closing portion of the disconnecting switch is contained in a cylindrical case; and the driving portion 53 which drives the contact point in the disconnecting switch extinction chamber 58. In the three-phase disconnecting switches, three disconnecting switch extinction chambers 58 are arranged in parallel with each other with respect to the mounting plate 2b to form extinction chambers for three phases as shown in FIG. 13 and this is operated such that the contact points in three disconnecting switch extinction chambers 58 are opening/closing-driven by one driving portion 53 attached on the opposite side of the mounting plate 2b. In the single-phase disconnecting switch, one disconnecting switch extinction chamber 58 is arranged with respect to the mounting plate 2b as shown in FIG. 15 and this is operated such that the contact point in the disconnecting switch extinction chamber 58 is opening/closing-driven by one driving portion 53 attached on the opposite side of the mounting plate 2b. Furthermore, an internal main circuit in the disconnecting switch extinction chamber 58 is connected to an external main circuit by a terminal 59.

Furthermore, the above description has been made on the case where the second disconnecting switch 42 is arranged such that the driving shaft 46 thereof is orthogonal to the driving shaft 23 of the circuit breaker 2; however, the second disconnecting switch 42 may be arranged such that the driving shaft 46 thereof is parallel to the driving shaft 23 of the circuit breaker 20; and in the case of a plurality sets of second disconnecting switches 42, the respective sets may be arranged in parallel in the vertical direction and mounted on a side portion of the gas tank 3 so as not to elongate the dimension in the depth direction.

Moreover, the second disconnecting switch 42 may be arranged such that the driving shaft 46 is placed in the vertical direction so that the driving portion 55 is placed at a top surface portion of the gas tank 3.

As described above, in the gas insulated switchgear according to Embodiment 1, the longitudinal direction of the circuit breaker (the moving direction of the driving shaft) is arranged parallel to the front portion of the gas insulated switchgear and horizontal, thereby having an effect that the length in the depth direction of the gas insulated switchgear can be shortened.

Embodiment 2

Figure 10:
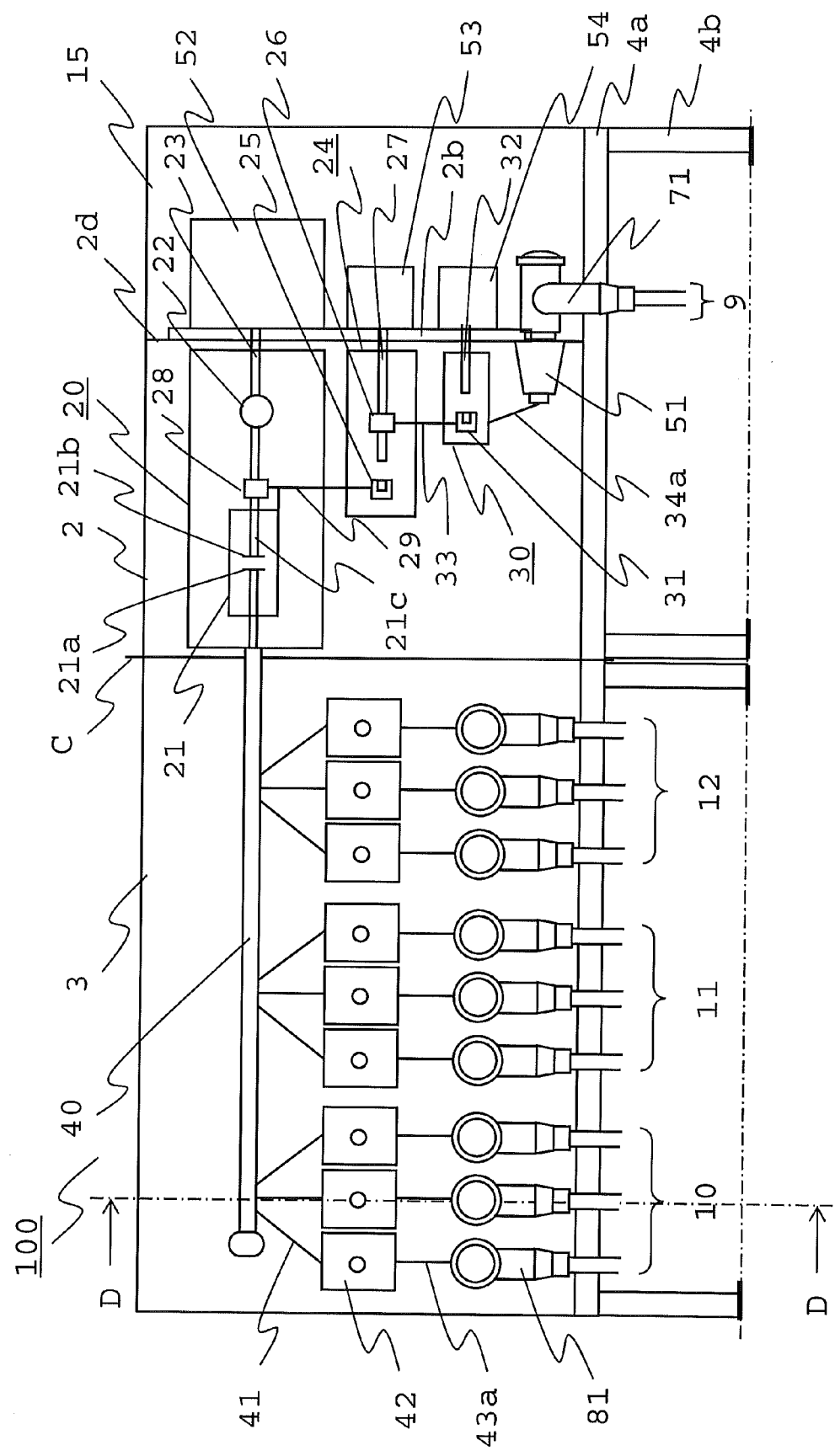
FIG. 10 is a perspective view showing an internal configuration seen from the front of a gas insulated switchgear according to Embodiment 2.
Figure 11:
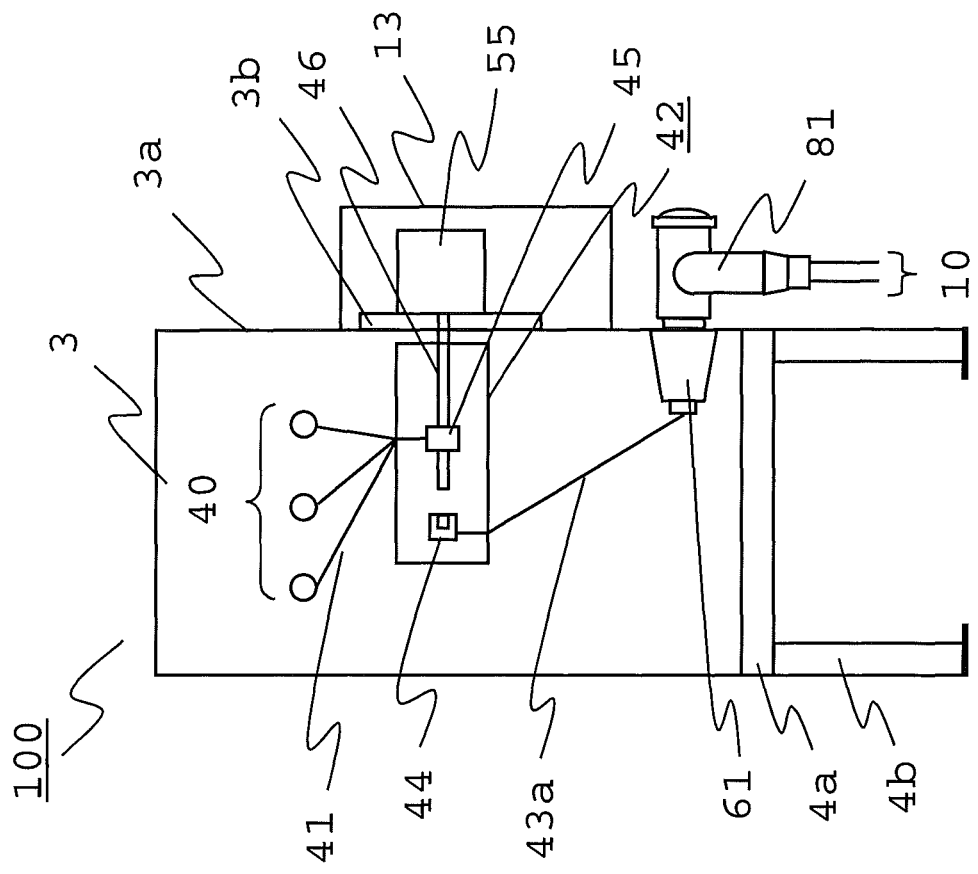
FIG. 11 is a relevant part view seen from a D-D portion of FIG. 10.

FIG. 10 is a perspective view showing an internal configuration seen from the front of a gas insulated switchgear 100 according to Embodiment 2. FIG. 11 is a relevant part view seen from a D-D portion of FIG. 10. Differences between the gas insulated switchgear 1 of Embodiment 1 and the gas insulated switchgear 100 of Embodiment 2 are such that the power cables 7 and 8 are connected in a state where the power cables are linearly raised upward from the base of the gas tanks 2 and 3 in Embodiment 1; whereas, power cables 71 and 81 each shaped in an L shape are used in Embodiment 2, the power cable 71 being connected to a side portion 2d of an gas tank 2 and the power cable 81 being connected to a front portion 3a of an gas tank 3. Other constitutional elements are the same as Embodiment 1 and therefore their description will be omitted.

The power cable 71 is connected to a cable terminal 51 serving as a first external lead-out circuit; and the power cable 81 is connected to a cable terminal 61 serving as a second external lead-out circuit. The cable terminal 51 is connected to a first disconnecting switch 24 by a connection conductor 34a; and the cable terminal 61 is connected to a second disconnecting switch 42 by a connection conductor 43a.

More particularly, in the case of connection with the second circuit 10, the third circuit 11, and the fourth circuit 12, even when the power cables 81 are applied to connect from the front portion 3a of the second gas tank 3 of the gas insulated switchgear 100, a protrusion portion of the power cable 81 in the depth (front) direction from the gas tank 3 is shorter than the operation portion 13 to be suppressed to the minimum; and therefore, the outline dimensions of the gas insulated switchgear 100 is not influenced. Furthermore, in Embodiment 1, connection work of the power cables 7 and 8 needs to be performed at a narrow place near the base of the gas tanks 2 and 3 and the base frame 4 on which the gas tanks 2 and 3 are placed needs to be heightened. However, in this embodiment, connection work of the power cables 71 and 81 can be carried out at side portions of the gas tanks 2 and 3; and therefore, there is an effect that work efficiency can be improved and the height dimension of the gas insulated switchgear 100 can be further reduced.

As described above, as in the Embodiment 1, the gas insulated switchgear according to Embodiment 2 has an effect that the length in the depth direction of the gas insulated switchgear can be shortened and the shape of the power cable is the L shape; and thus, there is an effect that the connection work of the power cables can be performed from the side portions of the gas tanks and the work efficiency can be improved.

Incidentally, in the above embodiments, the description has been made on the case where the gas tank is divided into two containers of the first gas tank 2 and the second gas tank 3; however, the gas tank may be one gas tank or may be divided into gas tanks more than above.

Figure 16:
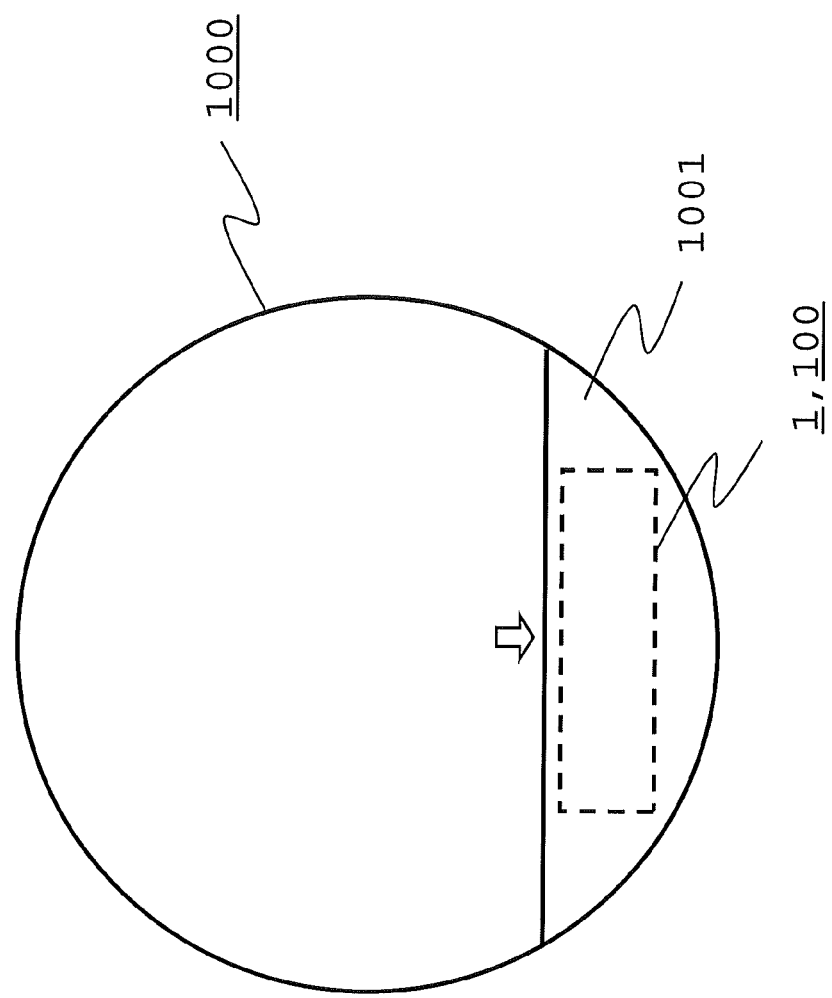
FIG. 16 is a schematic plan view showing an electrical compartment of a wind turbine of a wind-power generation system to which the gas insulated switchgear according to Embodiment 1 or Embodiment 2 is installed.

Furthermore, as a suitable example to which the gas insulated switchgear according to the present invention is applied, there is included a wind-power generation system. FIG. 16 shows a plan view of an electrical compartment 1001 of a wind turbine 1000 of the wind-power generation system on which the gas insulated switchgear 1 or 100 is installed. It is effective that the gas insulated switchgear of the present invention can be installed even at such a narrow installation space whose depth dimension is short.

In addition, the present invention can freely combine the respective embodiments and appropriately change or omit the respective embodiments, within the scope of the present invention.

Additionally, the same reference numerals as those shown in the drawings represent the same or corresponding elements.

DESCRIPTION OF REFERENCE NUMERALS

1, 100 Gas insulated switchgear; 2, 3 Airtight container; 2*a*, 3*a* Front portion; 7, 8, 71, 81 Power cable; 5, 6, 51, 61 Cable terminal; 20 Circuit breaker; 23 Driving shaft; 24 First disconnecting switch; 27, 46 Driving shaft; 30 Grounding switch; 40 Busbar; 42 Second disconnecting switch; 52, 53, 54, 55 Driving portion; 56 Circuit breaker extinction chamber; 57 Terminal; 58 Disconnecting switch extinction chamber; 59 Terminal; 1000 Wind turbine; and 1001 Electrical compartment.

The invention claimed is:

1. A gas insulated switchgear comprising:
   an gas tank filled with insulating gas;
   a circuit breaker which is contained in said gas tank, has a driving portion that drives a driving shaft, and is arranged such that the driving shaft is parallel to a front portion of said gas tank and horizontal;
   a first disconnecting switch which is contained in said gas tank, has a driving portion that drives a driving shaft, and is electrically connected to one end of said circuit breaker;
   a busbar which is contained in said gas tank, and is arranged to be electrically connected to the other end of said circuit breaker;
   second disconnecting switches of at least one set, said second disconnecting switches being contained in said gas tank, having a driving portion that drives a driving shaft, and being electrically connected to said busbar;
   a first external lead-out circuit which is electrically connected to said first disconnecting switch, and passes through the wall surface of said gas tank to be led out outside said gas tank; and
   second external lead-out circuits corresponding to the number of sets of said second disconnecting switches, said second external lead-out circuits being electrically connected to said second disconnecting switches, and passing through the wall surface of said gas tank to be led out outside said gas tank.

2. A gas insulated switchgear comprising:
   an gas tank filled with insulating gas;
   circuit breakers for the number of phases, said circuit breakers being contained in said gas tank, having a driving portion that drives a driving shaft, and being arranged such that the driving shaft is parallel to a front portion of said gas tank and horizontal;
   first disconnecting switches for the number of phases, said first disconnecting switches being contained in said gas tank, having a driving portion that drives a driving shaft, and being electrically connected to each one end of said circuit breakers;
   busbars for the number of phases, said busbars being contained in said gas tank, and being arranged to be electrically connected to the other ends of said circuit breakers;
   second disconnecting switches for the number of phases of at least one set, said second disconnecting switches being contained in said gas tank, having a driving portion that drives a driving shaft, and being electrically connected to said busbars;
   first external lead-out circuits for the number of phases, said first external lead-out circuits being electrically connected to said first disconnecting switches, and passing through the wall surface of said gas tank to be led out outside said gas tank; and
   second external lead-out circuits for the number of phases of the number of sets corresponding to the number of sets of said second disconnecting switches, said second external lead-out circuits being electrically connected to said second disconnecting switches, and passing through the wall surface of said gas tank to be led out outside said gas tank.

3. The gas insulated switchgear according to claim 1, wherein said busbars are arranged in parallel in a state so as to be parallel to the front portion of said gas tank and extended in a horizontal direction.

4. The gas insulated switchgear according to claim 2, wherein said busbars are arranged in parallel in a state so as to be parallel to the front portion of said gas tank and extended in a horizontal direction.

5. The gas insulated switchgear according to claim 1, wherein said first disconnecting switch is arranged such that the driving shaft thereof is placed horizontally and on the lower side or the upper side of said circuit breaker.

6. The gas insulated switchgear according to claim 2, wherein said first disconnecting switch is arranged such that the driving shaft thereof is placed horizontally and on the lower side or the upper side of said circuit breaker.

7. The gas insulated switchgear according to claim 1, wherein said second disconnecting switch is arranged such that the driving shaft thereof is placed orthogonal to the driving shaft of said circuit breaker and horizontally.

8. The gas insulated switchgear according to claim 2, wherein said second disconnecting switch is arranged such that the driving shaft thereof is placed orthogonal to the driving shaft of said circuit breaker and horizontally.

9. The gas insulated switchgear according to claim 7, wherein in the case where said second disconnecting switches are a plurality of sets, the respective sets are arranged in parallel with respect to a horizontal direction.

10. The gas insulated switchgear according to claim 8, wherein in the case where said second disconnecting switches are a plurality of sets, the respective sets are arranged in parallel with respect to a horizontal direction.

11. The gas insulated switchgear according to claim 9, wherein said second external lead-out circuits are placed such that the respective sets corresponding to said second disconnecting switches are queued up at a base portion of said gas tank.

12. The gas insulated switchgear according to claim 10, wherein said second external lead-out circuits are placed such that the respective sets corresponding to said second disconnecting switches are queued up at a base portion of said gas tank.

13. The gas insulated switchgear according to claim 9, wherein said second external lead-out circuits are placed such that the respective sets corresponding to said second disconnecting switches are queued up at the front portion of said gas tank.

14. The gas insulated switchgear according to claim 10, wherein said second external lead-out circuits are placed such that the respective sets corresponding to said second disconnecting switches are queued up at the front portion of said gas tank.

15. The gas insulated switchgear according to claim 1, wherein said second disconnecting switch is arranged such that the driving shaft thereof is parallel to the driving shaft of said circuit breaker.

16. The gas insulated switchgear according to claim 2, wherein said second disconnecting switch is arranged such that the driving shaft thereof is parallel to the driving shaft of said circuit breaker.

17. The gas insulated switchgear according to claim 1, wherein said gas tank includes independent two gas tanks; a first gas tank thereof contains said circuit breaker, said first disconnecting switch, and said first external lead-out circuit; and a second gas tank thereof contains said busbar, said second disconnecting switch, and said second external lead-out circuit.

18. The gas insulated switchgear according to claim 2, wherein said gas tank includes independent two gas tanks; a first gas tank thereof contains said circuit breaker, said first disconnecting switch, and said first external lead-out circuit; and a second gas tank thereof contains said busbar, said second disconnecting switch, and said second external lead-out circuit.

19. The gas insulated switchgear according to claim 1, wherein said gas insulated switchgear is installed in a wind turbine of a wind-power generation system.

20. The gas insulated switchgear according to claim 2, wherein said gas insulated switchgear is installed in a wind turbine of a wind-power generation system.

\* \* \* \* \*